(12) United States Patent
Lo et al.

(10) Patent No.: US 7,994,950 B1
(45) Date of Patent: *Aug. 9, 2011

(54) 100BASE-FX SERIALIZER/DESERIALIZER USING 1000BASE-X SERIALIZER/DESERIALIZER

(75) Inventors: William Lo, Cupertino, CA (US); Calvin Fang, Milpitas, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 12/874,343

(22) Filed: Sep. 2, 2010

Related U.S. Application Data

(60) Continuation of application No. 12/351,061, filed on Jan. 9, 2009, now Pat. No. 7,791,512, which is a continuation of application No. 11/900,484, filed on Sep. 12, 2007, now Pat. No. 7,477,172, which is a division of application No. 10/843,285, filed on May 11, 2004, now Pat. No. 7,277,031.

(60) Provisional application No. 60/529,654, filed on Dec. 15, 2003.

(51) Int. Cl.
*H03M 9/00* (2006.01)

(52) U.S. Cl. ........ 341/101; 341/100; 341/141; 370/386; 370/389; 370/445

(58) Field of Classification Search .................. 341/100, 341/101, 141; 370/386, 389, 445, 463, 468
See application file for complete search history.

(56) References Cited

U.S. PATENT DOCUMENTS

| | | | |
|---|---|---|---|
| 5,361,261 A | 11/1994 | Edem et al. | 370/445 |
| 5,675,584 A | 10/1997 | Jeong | 370/284 |
| 5,911,128 A * | 6/1999 | DeJaco | 704/200.1 |
| 5,999,563 A | 12/1999 | Polley et al. | 375/222 |
| 6,029,202 A | 2/2000 | Frazier et al. | 709/232 |
| 6,044,107 A | 3/2000 | Gatherer et al. | 375/222 |
| 6,141,352 A | 10/2000 | Gandy | 370/463 |
| 6,198,727 B1 | 3/2001 | Wakeley et al. | 370/247 |
| 6,222,380 B1 | 4/2001 | Gerowitz et al. | 326/38 |
| 6,222,852 B1 | 4/2001 | Gandy | 370/463 |
| 6,225,852 B1 | 5/2001 | Cleveland et al. | 327/534 |
| 6,259,961 B1 | 7/2001 | Inoue et al. | 700/112 |
| 6,430,242 B1 | 8/2002 | Buchanan et al. | 375/371 |
| 6,483,849 B1 | 11/2002 | Bray et al. | |
| 6,529,961 B1 | 3/2003 | Bray | |
| 6,559,692 B2 * | 5/2003 | Kimball et al. | 327/109 |
| 6,560,272 B1 | 5/2003 | Komatsu | 375/147 |
| 6,611,217 B2 | 8/2003 | Buchanan et al. | 341/100 |
| 6,771,671 B1 * | 8/2004 | Fields et al. | 370/514 |
| 6,816,505 B1 | 11/2004 | Sutardja et al. | 370/463 |
| 6,829,315 B1 | 12/2004 | Cruikshank | 375/354 |
| 6,873,630 B1 | 3/2005 | Muller et al. | 370/356 |
| 6,889,272 B1 | 5/2005 | Boxer et al. | 710/65 |
| 6,985,451 B1 * | 1/2006 | Nattiv et al. | 370/277 |

(Continued)

*Primary Examiner* — Linh V Nguyen

(57) ABSTRACT

A physical layer (PHY) device including a first encoder, a second encoder, and a selector. The first encoder is configured to receive a first data stream at a first data rate, encode the first data stream using a first type of encoding, and output a first encoded data via a plurality of outputs. The second encoder is configured to receive a second data stream at a second data rate, encode the second data stream using a second type of encoding, and output a second encoded data via an output. The selector includes a first set of inputs and a second set of inputs. The first set of inputs is configured to receive the plurality of outputs of the first encoder, and each input of the second set of inputs is configured to receive the output of the second encoder.

10 Claims, 6 Drawing Sheets

U.S. PATENT DOCUMENTS

| | | | |
|---|---|---|---|
| 6,987,739 B2 * | 1/2006 | Kitazawa et al. | 370/252 |
| 7,127,390 B1 * | 10/2006 | Su | 704/221 |
| 7,173,942 B1 | 2/2007 | Sutardja et al. | 370/463 |
| 7,183,793 B2 | 2/2007 | Jordanger et al. | 326/26 |
| 7,277,031 B1 | 10/2007 | Lo et al. | |
| 7,295,578 B1 | 11/2007 | Lyle et al. | |
| 7,314,548 B2 | 1/2008 | Perriello | |
| 7,324,548 B2 | 1/2008 | Natarajan et al. | 370/465 |
| 7,421,522 B1 | 9/2008 | Van Wageningen | |
| 7,433,971 B2 * | 10/2008 | Feuerstraeter et al. | 709/251 |
| 7,477,172 B1 | 1/2009 | Lo et al. | |
| 7,555,008 B2 | 6/2009 | Jorgenson et al. | |
| 7,804,847 B2 * | 9/2010 | Feuerstraeter et al. | 370/465 |
| 2002/0060587 A1 * | 5/2002 | Kimball et al. | 327/108 |
| 2002/0157054 A1 * | 10/2002 | Shin et al. | 714/748 |
| 2003/0185251 A1 * | 10/2003 | Ichino et al. | 370/535 |
| 2005/0163168 A1 | 7/2005 | Sheth et al. | 370/537 |
| 2005/0207398 A1 | 9/2005 | Choi et al. | 370/352 |
| 2008/0049788 A1 | 2/2008 | McClellan | 370/468 |

* cited by examiner

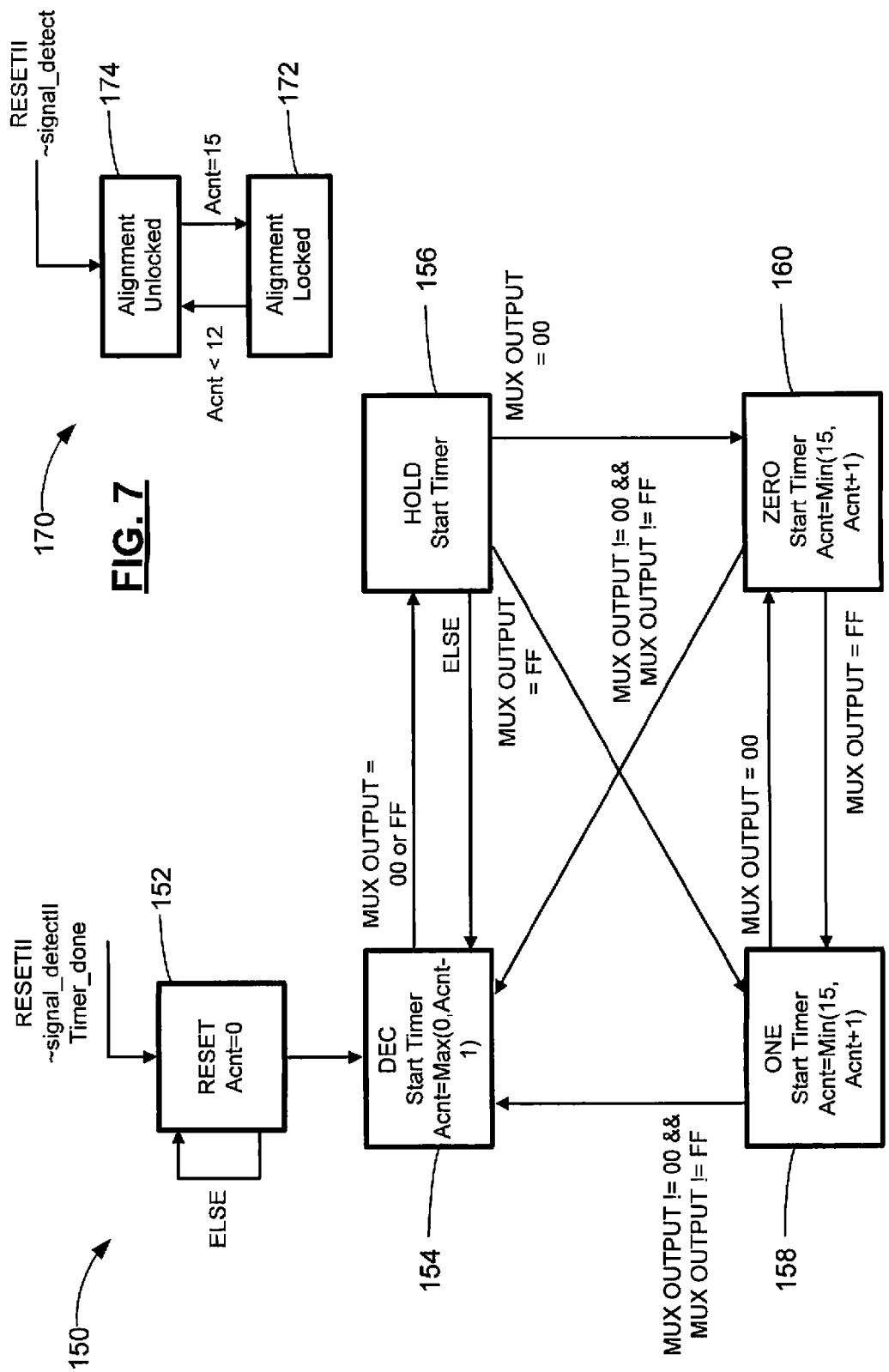

100BASE-FX SERIALIZER/DESERIALIZER USING 1000BASE-X SERIALIZER/DESERIALIZER

CROSS-REFERENCE TO RELATED APPLICATIONS

This application is a continuation of U.S. patent application Ser. No. 12/351,061, filed Jan. 9, 2009, which is a continuation of U.S. patent application Ser. No. 11/900,484 (now U.S. Pat. No. 7,477,172), filed Sep. 12, 2007, which is a divisional of U.S. application Ser. No. 10/843,285 (now U.S. Pat. No. 7,277,031), filed May 11, 2004, which application claims the benefit of U.S. Provisional Application No. 60/529,654, filed Dec. 15, 2003, all of which are hereby incorporated by reference in their entirety.

FIELD OF THE INVENTION

The present invention relates to networks, and more particularly to adapting a 1000BASE-X Serializer/Deserializer for 100BASE-FX communications in Ethernet networks.

BACKGROUND OF THE INVENTION

Referring to FIG. 1, a network device 10 includes a media access control (MAC) device 12 and a physical layer (PHY) device 14. The PHY device 14 includes a physical coding sublayer (PCS) device 16 and a serializer/deserializer (SERDES) 18. On a transmit path, an output of the MAC device 12 is input to a transmit PCS 20 of the PCS device 16. The transmit PCS 20 may perform 8 bit/10 bit encoding for 1000 Base-X. An output of the transmit PCS 20 is input to a fiber serializer 24 of the SERDES 18. In this example, the transmit PCS 20 receives data at 1.0 GHz and outputs encoded data at 1.25 GHz. The SERDES 18 operates at 1.25 GHz. The fiber serializer 24 converts the parallel data to serial data. The serial output of the fiber serializer 24 is output at 28.

On a receive side, serialized data is received at 30 and is input to a fiber deserializer 32, which converts the serial data to parallel data. The parallel data is output to a receive PCS 34, which may perform 8 bit/10 bit decoding for 1000 Base-X. An output of the receive PCS 34 is coupled to the MAC device 12. In this example, the MAC device 12 supports 1000 Base-X.

There are situations when it is desirable to support communications at different data rates. For example, it may be desirable to operate at 100Base-X rates such as 100Base-FX in addition to operation at 1000Base-X. 100Base-FX, however, utilizes a SERDES that operates at a lower data rate than the SERDES 18 used for 1000Base-X. 100Base-FX also uses a different type of PCS encoding/decoding. To address the dual speeds, conventional PHY/MAC devices employ two sets of SERDES, which increases the cost of the MAC/PHY devices and the network device 10.

SUMMARY OF THE INVENTION

A physical layer device comprises a deserializer that deserializes one of first and second data streams. The first data stream includes successive N-bit sequences having one of all ones and all zeros. A converter oversamples the first data stream, identifies edge transitions in the first data stream to locate N adjacent bits that substantially align with the N-bit sequences, and samples at least one bit of the N adjacent bits.

In other features, a coding device includes a first decoding device that communicates with the deserializer and that performs a first type of decoding. A second decoding device communicates with the converter and performs a second type of decoding. The converter receives N-bits of data per cycle from the deserializer and stores M adjacent bits.

In still other features, a medium communicates with an input of the deserializer. A serializer has an output that communicates with the medium and serializes one of third and fourth data streams. The coding device further comprises a first encoding device that communicates with an input of the serializer and that performs a first type of encoding. A second encoding device communicates with an input of the serializer and performs a second type of encoding. An output selector selectively connects the one of the first and second encoding devices to the input of the serializer. The output selector includes a multiplexer.

A network device comprises the physical layer device and further comprises a medium access control (MAC) device that communicates with the coding device.

The first decoding device is compliant with 1000Base-X. The second decoding device is compliant with 100Base-FX. The first encoding device is compliant with 1000Base-X. The second encoding device is compliant with 100Base-X. The converter includes an edge detector that detects edges in the M adjacent bits and that selectively adjusts a selector signal based on the detected edges. A data block selector selects N adjacent bits as one of the N-bit sequences from the M adjacent bits based on the selector signal.

In other features, the edge detector includes a counter that is adjusted based on a position of the edge transitions in the M adjacent bits. The counter includes X bits and the selector signal is based on less than X most significant bits (MSB) of the X-bit counter. The counter is reset to approximately a mid-point of the counter at initialization.

A physical layer device comprises a deserializer that deserializes one of first and second data streams. The first data stream includes successive N-bit sequences having one of all ones and all zeros. An edge detector detects edge transitions in the N-bit sequence and selectively adjusts a selector signal based on the detected edge transitions. A data block selector receives N bits of data per cycle from the deserializer, stores M adjacent bits, and selects N adjacent bits from the M adjacent bits as one of the N-bit sequences based on a selector signal.

In other features, the N adjacent bits include one of all ones and all zeros when the N adjacent bits are properly aligned with the one of the N-bit sequences. A data sampler samples one bit of the N adjacent bits to represent one of the N-bit sequences. The edge detector includes a counter that is adjusted based on a position of the edge transitions in the M adjacent bits. The counter includes X bits and the selector signal is based on less than X most significant bits (MSB) of the X-bit counter. The counter is reset to approximately a mid-point of the counter at initialization.

A transmit path in a physical layer device comprises a first transmit encoding device that has N outputs, that receives a first data stream at a first data rate and that performs a first type of encoding on the first data stream. A second transmit encoding device has an output, receives a second data stream at a second data rate and performs a second type of encoding on the second data stream. The first data rate is N times the second data rate. An output selector has a first set of N inputs that communicates with the N outputs of the first transmit encoding device, a second set of N inputs that communicate with the output of the second transmit encoding device and N outputs. The output selector selectively connects one of the first and second sets of N inputs to the N outputs.

In other features, the first encoding device is compliant with 1000Base-X. The second encoding device is compliant with 100Base-FX. The output selector includes a multiplexer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a state diagram illustrating operation of the converter according to the present invention; and FIG. 7 is a state diagram illustrating alignment lock and unlock states according to the present invention.

DETAILED DESCRIPTION OF THE PREFERRED EMBODIMENTS

Figure 1:
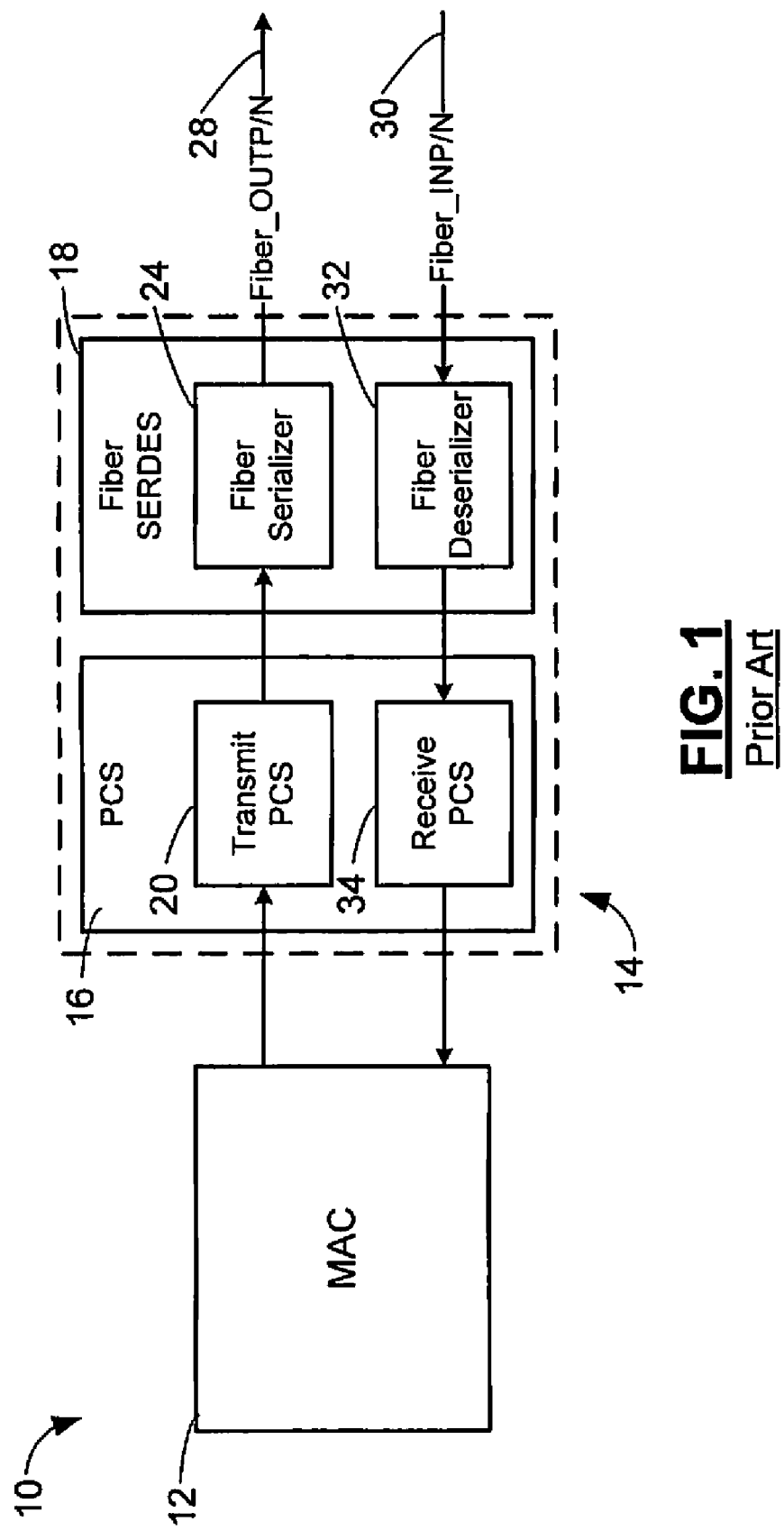
FIG. 1 is a functional block diagram of a network device that includes a MAC device and a PHY device that implement 1000Base-X according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term device refers to an application specific integrated circuit (ASIC), an electronic circuit, a processor (shared, dedicated, or group) and memory that execute one or more software programs, a combinational logic circuit, and/or other suitable components that provide the described functionality.

Figure 2:
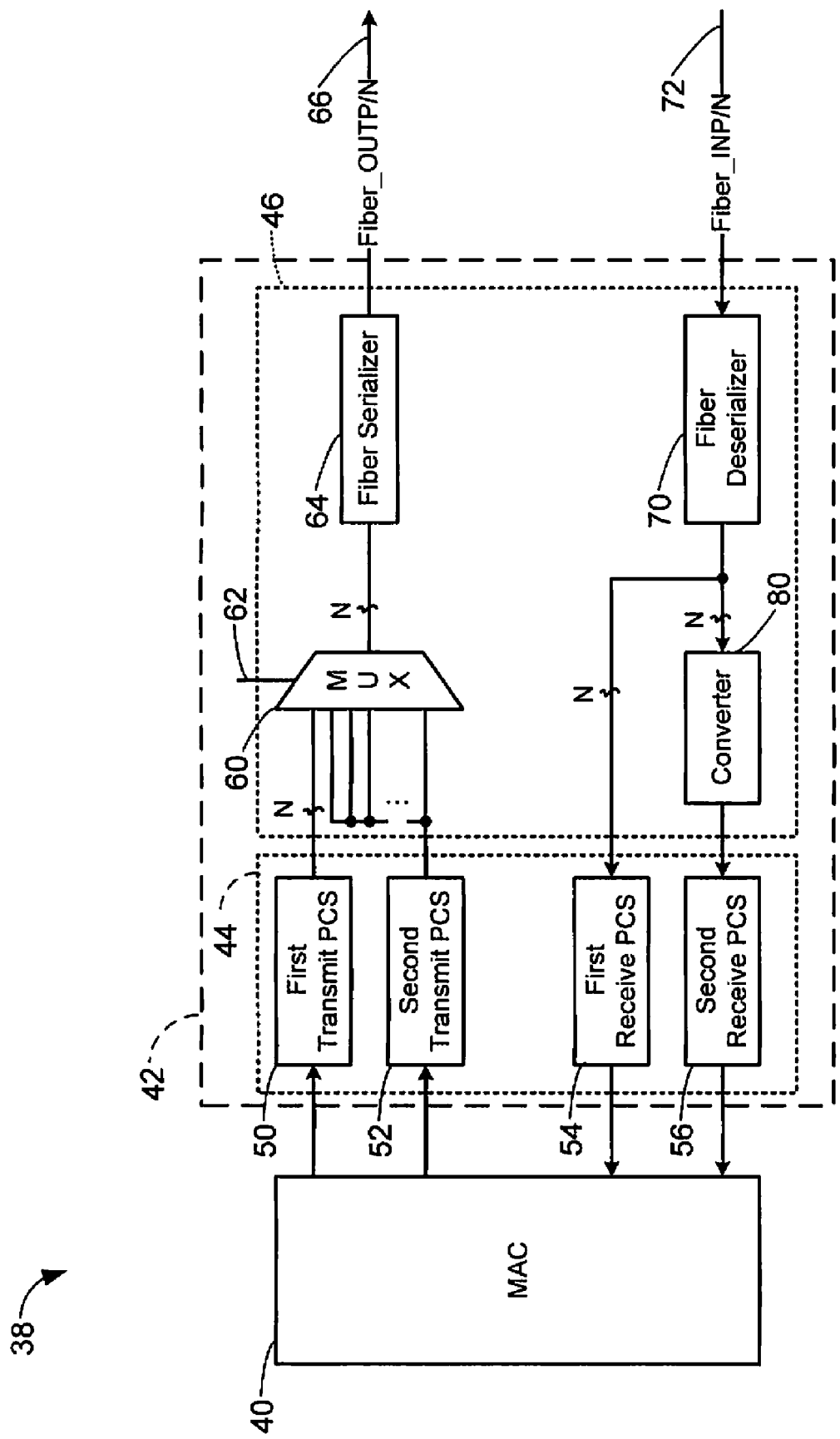
FIG. 2 is a functional block diagram of a network device that includes MAC and PHY devices that operate at first and second data rates according to the present invention.

Referring now to FIG. 2, a network device 38 includes a MAC device 40 and a PHY device 42. The PHY device 42 includes a Physical Coding Sublayer (PCS) 44, which provides coding for packet delineation and scrambling for the PHY device. For example, for Gigabit Ethernet, 8 bit/10 bit encoding is typically used. The PHY also includes a SERDES 46. The MAC and PHY devices 40 and 42, respectively, operate at first and second data rates and/or protocols. While a single MAC device that operates at both data rates is shown, two MAC devices that operate different data rates may by provided. The PCS 44 includes a first transmit PCS 50, a second transmit PCS 52, a first receive PCS 54, and a second receive PCS 56. The first transmit PCS 50 and first receive PCS 54 are utilized when operating the network device 38 at the first data rate and/or protocol. The second transmit PCS 52 and the second receive PCS 56 are utilized when operating the network device 38 at the second data rate and/or protocol.

When operating at the first data rate and/or protocol, data is output by the MAC 40 to the first transmit PCS 50, which encodes the data. An output of the first transmit PCS 50 is input to a first set of inputs of a multiplexer 60. The multiplexer 60 connects the first set of inputs to the N outputs thereof when the network device 38 operates at the first data rate. A select input signal 62 may be used by the network device 38 to toggle the multiplexer 60 between the first set of inputs and a second set of inputs. The output of the multiplexer 60 is input to a fiber serializer 64 in the SERDES 46, which serializes and outputs the data at 66.

On the return or receive path, data is received by the fiber deserializer 70 at 72. The fiber deserializer 70 converts the serial data to parallel data. The output of the fiber deserializer 70 is coupled to the first receive PCS 54, which decodes the data and outputs the decoded data to the MAC device 40.

When operating at the second data rate and/or protocol, data is output by the MAC device 40 to the second transmit PCS 52, which encodes the data. An output of the second transmit PCS 52 is input to the second set of inputs of the multiplexer 60. The multiplexer 60 connects the second set of inputs to the N outputs thereof when the network device 38 operates at the second data rate. The N outputs of the multiplexer 60 are input to the fiber serializer 64 in the SERDES 46, which serializes and outputs the data at 66.

On the return or receive path, data is received by the fiber deserializer 70 at 72. The fiber deserializer 70 converts the serial data to parallel data. The output of the fiber deserializer 70 communicates with a converter 80. The converter 80, in turn, samples and selects one bit for each of the N-bit sequences. The converter 80 outputs the selected bits to the second receive PCS 56. The second receive PCS 56 decodes the data and outputs data to the MAC device 40.

In one embodiment, the first data rate and/or protocol is compliant with 1000Base-X. The second data rate and/or protocol is compliant with 100Base-FX. The first transmit PCS 50 outputs encoded parallel data at 1.25 GHz, or 10 bits per 8 ns cycle. The second transmit PCS 52 outputs data at 125 Mhz, or 1 bit per 8 ns cycle. In this embodiment, the single bit output by the second transmit PCS 52 is connected to the second set of N inputs of the multiplexer 60 to duplicate the data ten times. The SERDES 46 operates at 1.25 GHz.

Figure 3:
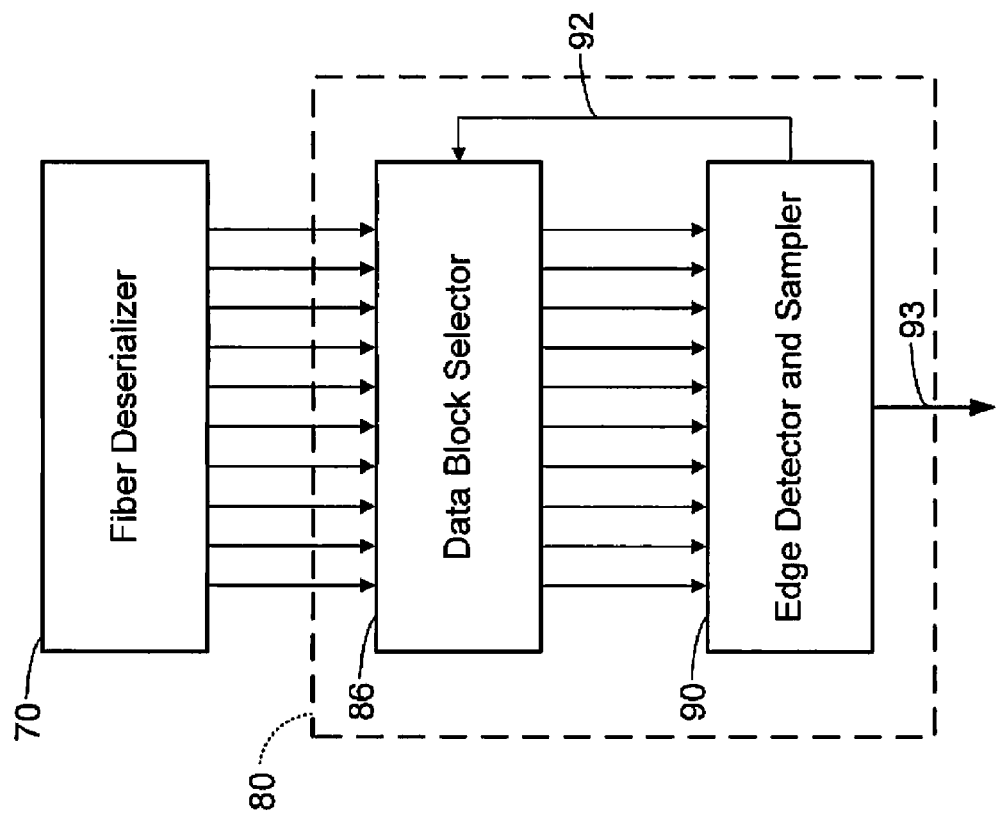
FIG. 3 is a functional block diagram of a converter according to the present invention.

Referring now to FIG. 3, during operation at the second data rate and/or protocol, the converter 80 selects one of the bits output by the fiber deserializer 70 for every N bits. When operating at the second data rate and/or protocol, the data will transition every N bits. The converter 80 ensures proper alignment when sampling one bit for every N bits and prevents errors that may otherwise occur. In other words, the converter 80 samples the N-bit sequence at the correct position to avoid skipping data, repeating data and/or sampling noise. One purpose of the converter 80 is to align the N-bit sequences that are received from the fiber deserializer 70. To correctly sample the N-bit sequence, the converter adjusts the position of a sampling window. If the sample window is adjusted too quickly, it is possible that the same N-bit sequence could be sampled twice or not at all.

The converter 80 includes a data block selector 86 and an edge detector and sampler 90. The data block selector 86 receives N-bit blocks and stores M adjacent bits from the fiber deserializer 70, where M>N. For example, if N=10, M may be set equal to 24, although additional or fewer bits may be used. The data block selector selects the sample window including the N-bit sequence from the M adjacent bits based on a selector signal 92. The edge detector and sampler 90 detects bit transitions in the sample window (including an N-bit sequence). The edge detector and sampler 90 determines whether the sample window used by the data block selector 86 is properly aligned with the data from the fiber deserializer 70. Because the single data bit is duplicated N times when the second data rate is used, the N-bit sequence should be all logical ones or all logical zeros when the data block selector

86 is properly aligned. If the data block selector 86 is not properly aligned, one or more of the bits in the selected N-bit sequence will not be identical and a transition will occur in the data.

If the edge detector and sampler 90 determines that there is a transition in the data, the edge detector and sampler 90 adjusts a selector signal 92 to shift the sample window relative to the M adjacent bits. The selector signal 92 may be proportional to the location of the transition in the N-bit sequence. Alternately, the selector signal may be based on the location of the transition. The data block detector 86 adjusts the position of the sample window based on the selector signal 92. The data block detector 86 and the edge detector and sampler 90 continue to realign the data from the fiber deserializer 70 until transitions are not detected in the N-bit sequence. The edge detector and sampler 90 also samples and outputs one bit of the N-bit sequence to the MAC device as shown at 93. The sampled bit is preferably located at or near a midportion of the selected N-bit sequence.

Figure 4:
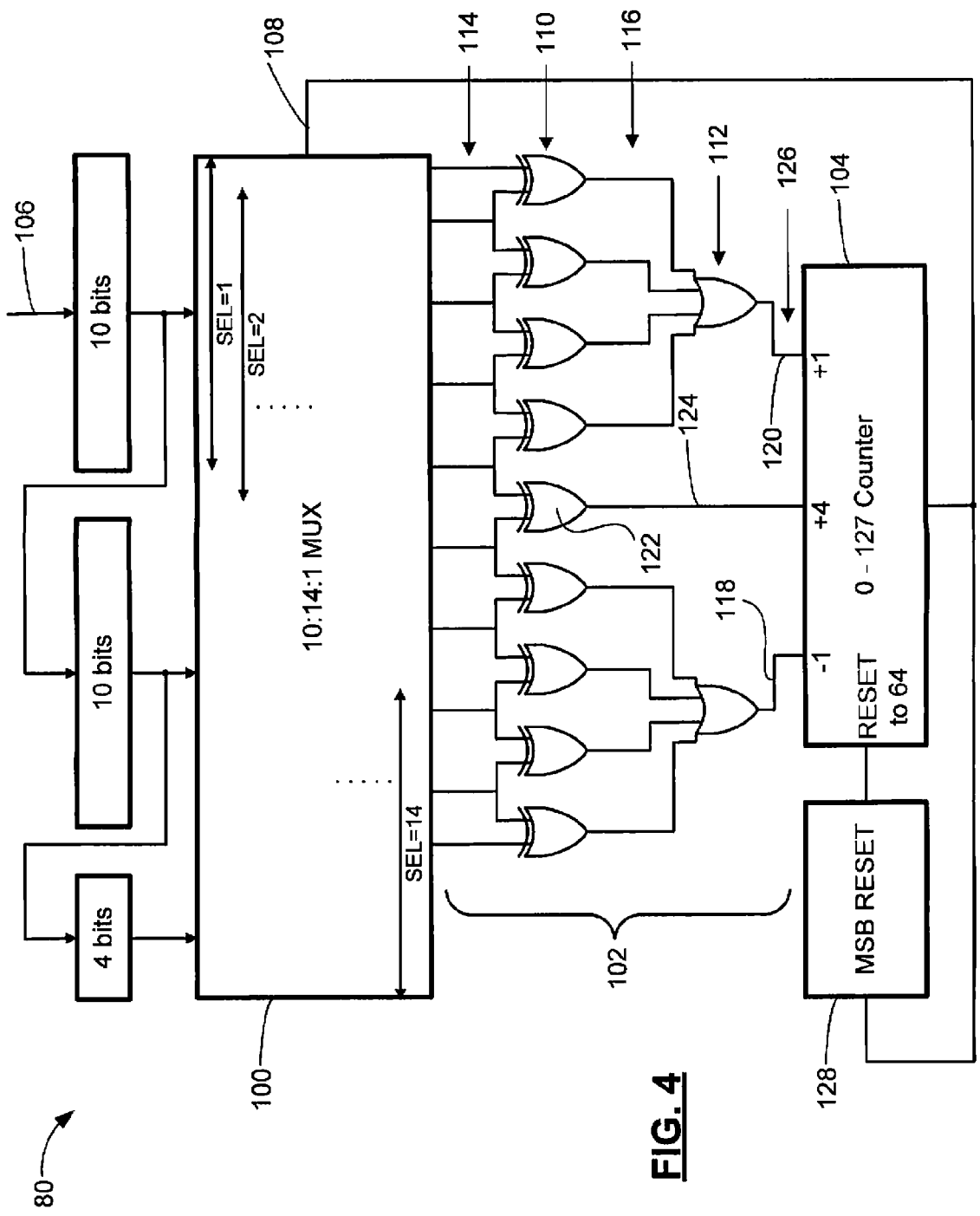
FIG. 4 is a more detailed electrical schematic of the converter of FIG. 3 according to the present invention.

Referring now to FIG. 4, an exemplary implementation is shown. The converter 80 includes a multiplexer 100, a logic gate array 102, and a counter 104. The multiplexer 100 is an N:(M−N):1 multiplexer that receives N bits of data per cycle from the fiber deserializer 70 at an input 106. The multiplexer 100 stores M adjacent and most recently-received bits from the fiber deserializer 70. The multiplexer 100 selects and outputs N of the M bits based on a selector input 108. In a preferred implementation, N=10 and M=24.

The logic gate array 102 includes XOR gates 110 in a first stage and OR gates 112 in a second stage. The XOR gates 110 receive multiplexer output bits 114 from the multiplexer 100. If multiplexer output bits 114 are all ones or all zeros, XOR gate outputs 116 will all be logical zeros. If at least one of the multiplexer output bits 114 is different, at least one of the XOR gate outputs 116 will be a logical one. An output of one or more of the OR gates 112 will also be one.

The counter 104 receives outputs 126 of the OR gates. If all of the outputs 126 are logical zeros, the counter 104 does not increment or decrement. If either the first OR gate output 118 or the second OR gate output 120 is one, the counter 104 will increment or decrement by one, respectively. If the middle XOR gate output 124 is a one, the counter 104 will increment by four. As can be appreciated, the counter can be incremented and/or decremented by two and/or three if desired using additional OR gates. The counter 104 outputs the four most significant bits (MSB) of the value stored in the counter 104 as the selector input 108. By using the four MSB as the selector signal, hystersis is built into the system.

The counter 104 is initially reset to 64. In other words, at system power ups and resets the counter 104 is set at 64, or binary 1000000. Therefore, the selector input 108 starts at 1000 or position 8, which is near the middle of the M adjacent bits. If the counter 104 increments due to a logical one at the second OR output gate 120, the binary value of the counter 104 will be 1000001. The counter 104 must increment to 72, or binary 1001000, before the four MSB are affected and a shift in the position of the sampler window occurs. If the counter 104 decrements due to a logical one at the first OR output gate 118, the binary value of the counter 104 will be 0111111. Since we started at 1000000 (binary 64), decrementing by 1 would change the count to 0111111 and the 4 MSB changes from 1000 to 0111. The effect is immediate. Note however we need to decrement by eight after that, that is 0111111→0110111 to move the MSB again, this time from 0111 to 0110. In this manner, the counter 104 must increment or decrement multiple times in order to affect the value of the four MSB. Further, the counter 104 increments by four if the middle XOR gate output 124 is a logical one.

The four MSB vary between 0 and 15, or binary 0000 and 1111. However, a reset module 128 resets the counter 104 to 64 if the four MSB are 0000 or 1111. In other words, the four MSB will vary between 1 and 14, or binary 0001 and 1110. As a result, the selector input 108 will vary between 1 and 14. Therefore, the multiplexer 100 is capable of fourteen alignment positions. The reset module 128 may also reset the counter 104 in other circumstances, such as a PCS or system reset or a loss of a signal.

If the converter 80 is properly aligned with the data, all ten of the output bits 114 will be identical, the outputs 126 will all be zeros, and the counter 104 will not increment or decrement. However, when the converter 80 is not properly aligned, all of the output bits 114 will not be identical and the counter 104 will either increment or decrement. If the counter 104 increments or decrements enough to change the value of the MSB, the selector input 108 is changed. The value of the selector input 108 determines the alignment of the multiplexer 100.

Figure 5:
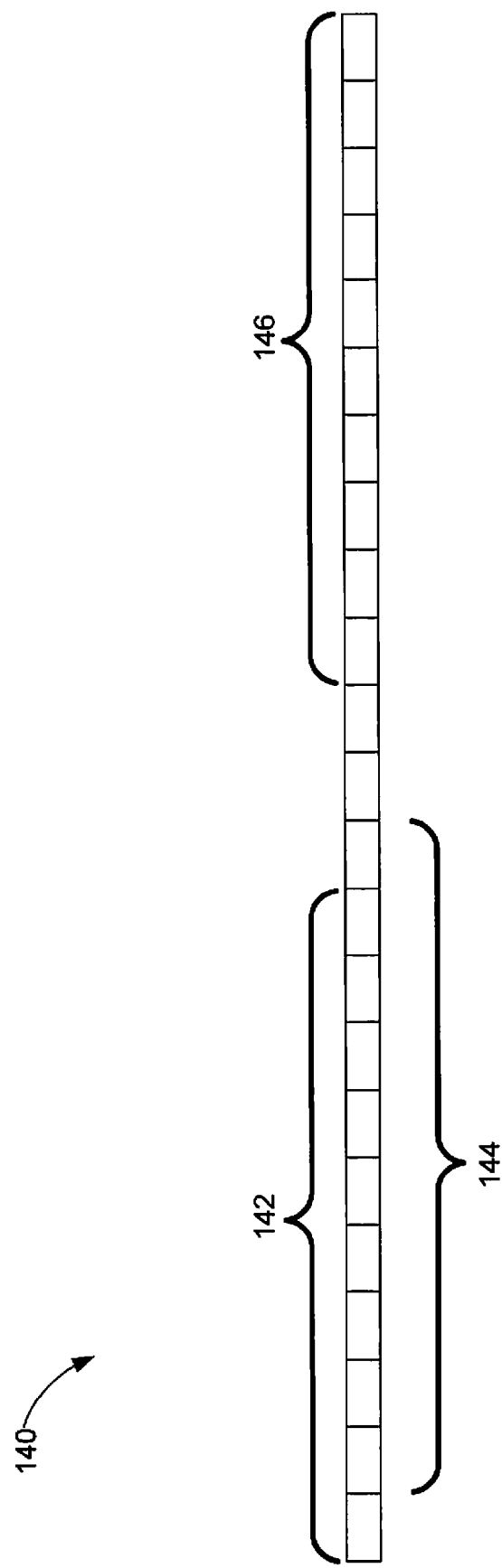
FIG. 5 illustrates possible alignment positions of the converter according to the present invention.

The alignment of the multiplexer 100 is described in FIG. 5, with reference to the components described in FIG. 4. The most recent 24 bits of data that the multiplexer 100 received are represented by data block 140. If the selector input 108 is 0001, the multiplexer 100 is aligned at a first position 142. If the selector input 108 is 0010, the multiplexer 100 is aligned at a second position 144. If the selector input 108 is 1110, the multiplexer is aligned at a fourteenth position 146. In this manner, the selector input 108 determines one of fourteen multiplexer alignment positions. At any selected alignment position, the converter 80 samples one of the N bits in the sample window.

If any of the N bits at a selected alignment position are different, an edge or a data transition will be present. The counter 104 increments or decrements. When the MSB of the counter change, the selector signal changes the position of sample window for the N sampled bits. If the edge occurs at a position consistent with the middle XOR gate 122, the converter 80 determines that a larger shift is necessary. Therefore, the counter 104 increments by four.

Referring still to FIG. 5, nineteen data bits and 10 alignment positions are required in order to properly align the multiplexer 100 with a ten bit data sequence. However, it is possible that jitter or duty cycle distortion may cause the edge bits to appear to be different from the middle eight bits. In this case, the counter 104 may drift back and forth, causing the selector input 108 to drift between two alignment positions. This may cause the converter 80 to skip or repeat a data bit. Therefore, the preferred embodiment uses fourteen alignment positions in order to prevent this problem. Additionally, the converter 80 may be structured to sample only the eight middle bits of a N-bit sequence in order to avoid the edge bits.

Referring now to FIG. 6, an alignment lock state machine 150 determines whether the converter 80 has achieved proper alignment. At reset state 152, an alignment counter is set to zero. At decrement state 154, the alignment counter (Acnt) is set equal to a maximum of 0 or Acnt−1. If the multiplexer 100 outputs all logical ones or logical zeros, the state machine 150 determines that the multiplexer 100 is properly aligned and transitions to hold state 156. The middle 8 bits of multiplexer 100 are examined. If the bits are all logical ones, or FF, the state machine 150 transitions to one state 158 and Acnt is set equal to a minimum value of 15 or Acnt+1.

If the bits are all logical zeros, or 00, the state machine 150 transitions to zero state 160 and Acnt is set equal to a minimum value of 15 or Acnt+1. If the output bits transition from FF to 00 while the state machine 150 is at the one state 158, the state machine 150 transitions to the zero state 160. If the output bits transition from 00 to FF while the state machine is at the zero state 160, the state machine 150 transitions to the one state 158. However, if the output bits are not all ones and not all zeros while the state machine 150 is at the state one 158 or the zero state 160, the state machine 150 transitions to the decrement state 152.

Referring now to FIG. 7, a second alignment lock state machine 170 determines if the alignment position is locked. In the preferred embodiment, the alignment position is locked when the alignment counter is greater than or equal to twelve. Therefore, if the alignment counter is between twelve and fifteen, the second alignment lock state machine 170 is at locked state 172. If the alignment counter decrements below twelve, the second alignment lock state machine 170 is at unlocked state 174.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A physical layer (PHY) device, comprising:
   a first encoder configured to
      receive a first data stream at a first data rate,
      encode the first data stream using a first type of encoding to generate first encoded data, and
      output the first encoded data via a plurality of outputs;
   a second encoder configured to
      receive a second data stream at a second data rate, wherein the second data rate is different than the first data rate,
      encode the second data stream using a second type of encoding to generate second encoded data, wherein the second type of encoding is different than the first type of encoding, and
      output the second encoded data via an output; and
   a selector including
      a first set of inputs configured to receive the plurality of outputs of the first encoder, and
      a second set of inputs, wherein each input of the second set of inputs is configured to receive the output of the second encoder.

2. The PHY device of claim 1, wherein the selector is further configured to:
   connect the first set of inputs of the selector to a plurality of outputs of the selector when the PHY device transmits at the first data rate, and
   connect the second set of inputs of the selector to the plurality of outputs of the selector when the PHY device transmits at the second data rate.

3. The PHY device of claim 1, wherein the first data rate is an integer multiple of the second data rate.

4. The PHY device of claim 2, further comprising a serializer configured to serialize data received from the plurality of outputs of the selector.

5. The PHY device of claim 1, wherein:
   the first encoder is compliant with 1000Base-X; and
   the second encoder is compliant with 100Base-FX.

6. A method, comprising:
   receiving a first data stream at a first data rate;
   encoding the first data stream using a first type of encoding to generate first encoded data;
   outputting, to a first set of inputs of a selector, the first encoded data via a plurality of outputs;
   receiving a second data stream at a second data rate, wherein the second data rate is different than the first data rate;
   encoding the second data stream using a second type of encoding to generate second encoded data, wherein the second type of encoding is different than the first type of encoding;
   outputting, to a second set of inputs of the selector, the second encoded data via an output; and
   configuring each input of the second set of inputs of the selector to receive the second encoded data output via the output.

7. The method of claim 6, further comprising:
   connecting the first set of inputs of the selector to a plurality of outputs of the selector when transmitting at the first data rate, and
   connecting the second set of inputs of the selector to the plurality of outputs of the selector when transmitting at the second data rate.

8. The method of claim 6, wherein the first data rate is an integer multiple of the second data rate.

9. The method of claim 7, further comprising serializing data received from the plurality of outputs of the selector.

10. The method of claim 6, wherein:
    the first type of encoding is compliant with 1000Base-X; and
    the second type of encoding is compliant with 100Base-FX.

* * * * *